April 6, 1937.                R. GASCHKE                2,076,142
                         REFRIGERATING DEVICE
                         Filed April 25, 1936
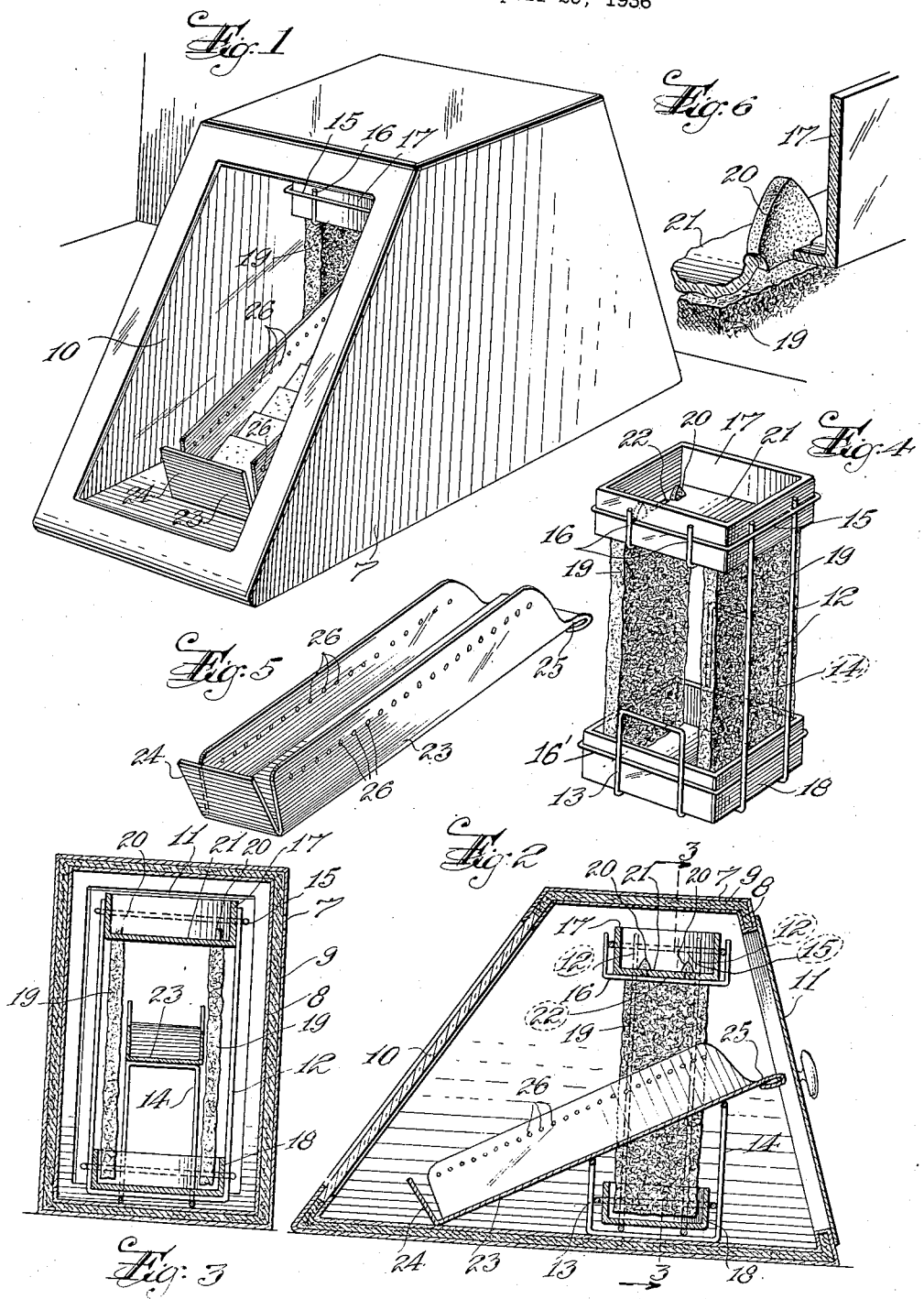
INVENTOR
Richard Gaschke
BY Frak C. Fischer
ATTORNEY Patented Apr. 6, 1937

2,076,142

UNITED STATES PATENT OFFICE 2,076,142

REFRIGERATING DEVICE

Richard Gaschke, East Orange, N. J.

Application April 25, 1936, Serial No. 76,307

5 Claims. (Cl. 99—243)

This invention relates to refrigerating devices, and more particularly such devices adapted to preserve and humidify cheese and other food products.

Heretofore, it has been the custom to sell cheese in bulk form, but it has been found desirable to provide the cheese to grocery stores, especially chain grocery stores, already sliced, thereby obviating the necessity for the grocer to slice cheese in the presence of a customer. However, the supplying of sliced cheese has been found objectionable in that after a day or so the cheese becomes dry, and naturally unsaleable. The drying of the cheese takes place much more rapidly in electric refrigerators than even in the open air. In fact, with reference to Swiss cheese especially, it has been found to be practically impossible to keep cheese in a sliced form in an electric refrigerator for a longer period than twenty-four hours without a material drying of the cheese.

It is therefore an object of this invention to provide a simple and inexpensive refrigerating device for preserving and humidifying cheese in order to maintain the proper amount of moisture at all times.

A further object is the provision of an economical refrigerating and humidifying device for preserving cheeses and other foods, which devices can be conveniently located on a sales counter for display purposes.

A further object is the provision of a simple and convenient refrigerating and humidifying device for food products which occupies a relatively small space, and which can be effectively operated by using ice or water. The device has a structure which enables it to be readily cleaned from time to time.

These and other advantageous objects, which will later appear, are accomplished by the simple and practical construction and arrangement of parts hereinafter described and exhibited in the accompanying drawing, forming part hereof, and in which:

Fig. 1 is a perspective view of a refrigerating device embodying my invention,

Fig. 2 is a side view of the device in section,

Fig. 3 is a sectional view taken on line 3—3 of Fig. 2,

Fig. 4 is a perspective view of a frame used in the device,

Fig. 5 is a perspective view of a tray used in the device, and

Fig. 6 is a fragmentary perspective view of a connection between elements of the device.

Referring to the drawing, the refrigerating and humidifying device is shown to comprise a casing having spaced walls 7 and 8, separated by a heat insulating material 9, such as generally employed in refrigerating devices. The ends of the casing are inclined, one end being provided with a window 10 of glass, or similar transparent material; and the other end frictionally receives a cover 11.

Positioned inside of the casing is a frame having a pair of spaced U-shaped wire members 12 and a rectangular wire member bent into a U-shape to provide supports 13 and 14, which are of unequal height, for a purpose hereinafter explained.

The upper ends of the legs of the members 12 are connected, by welding or other means, to a rectangular wire member 15; which is connected to wires 16, spaced apart and bent into U-shapes. The members 15 and 16 form a support for a tray 17, preferably made of glass or other suitable material.

The U-shaped members 12, 13 and 14, which are connected by a rectangular wire member 16', also support a lower tray 18, preferably made of glass or other suitable material.

The upper tray 17 has in the bottom 21 thereof apertures through which pass flexible rubber tangs 20 by means of which sheets 19 of sponge rubber are suspended so that the lower ends thereof are spaced slightly from the tray 18. The tangs 20 are integral with the sheets 19. The bottom 21 of tray 17 is also provided with slots 22 directly above the sheets 19.

A metal pan 23 rests upon the members 13 and 14, and due to the difference in height of the members 13 and 14, the pan is inclined with handle 25 thereof elevated and adjacent the cover 11. In Fig. 1, the pan 23 is shown to have a plurality of squares of cheese positioned therein. The pan 23 has a plurality of ventilating apertures 26 in the side walls and bottom thereof; and the end wall 24 is inclined and spaced slightly from the side walls, thereby enabling free circulation of air throughout the pan at all times.

In using the device, the upper tray 17 is filled with cracked ice; and the water resulting from the melting thereof passes through slots 22 and also around the tangs 20, and trickles down the sheets 19 into the lower tray 18. In this manner there is obtained an even cooling temperature accompanied by the amount of moisture necessary to maintain sliced cheese, or other products, in a proper condition for an indefinite length of time. These cheese is sliced and placed on the inclined pan 23, which is positioned between the sheets 19.

The contents of the casing is visible through the window 10, and the device can be advantageously used for display purposes to induce persons to buy cheese or other contents thereof.

While the sheets 19 have been described as being made of sponge rubber, they can also be made of felt, and other porous and absorbent materials.

From the above description it will be seen that there has been provided a simple and inexpensive device for conveniently and effectively preserving sliced Swiss cheese and other cheeses, preventing drying of the cheese by providing at all times the proper amount of moisture.

The foregoing disclosure is to be regarded as descriptive and illustrative only, and not as restrictive or limitative of the invention, of which obviously embodiments may be constructed including many modifications, without departing from the general scope herein indicated and denoted in the appended claims.

Having thus described my invention, what I claim as new and desire to secure by Letters Patent, is:

1. In a refrigerating and humidifying device for cheese and other food products, a casing, a wire frame positioned in the casing, an upper tray and a lower tray supported by said wire frame, spaced sheets of spong rubber depending from the bottom of the upper try, said upper tray having slots in the bottom thereof to enable the passage of water onto said sheets, and a pan for holding cheese or other food products positioned between said sheets.

2. In a refrigerating and humidifying device for cheese and other food products, a casing, a wire frame positioned in the casing, an upper tray and a lower tray supported by said wire frame, spaced sheets of water absorbing material depending from the bottom of the upper tray, said sheets having their lower ends slightly spaced from the lower tray, means in the bottom of the upper tray to enable the passage of water on to said sheets, a pan for holding cheese or other food products positioned between said sheets, and means on said frame for supporting said pan in an inclined position.

3. In a refrigerating and humidifying device for cheese and other food products, a casing, a frame positioned in the casing, a tray supported by said frame, spaced sheets of water absorbent material depending from the bottom of said tray, said tray having slots in the bottom thereof to enable the passing of water onto said sheets, and a pan for holding cheese or other food products positioned between said sheets.

4. In a refrigerating and humidifying device for cheese and other food products, a casing, a frame positioned in the casing, a tray supported by said frame, spaced sheets of water absorbent material depending from the bottom of said tray, said tray having slots in the bottom thereof to enable the passing of water onto said sheets and a pan for holding cheese or other food products positioned between said sheets, and means for supporting said pan in an inclined position.

5. In a refrigerating and humidifying device for cheese and other food products, a casing, a tray having slots in the bottom thereof, means for supporting said tray, sheets of water absorbent material depending from the bottom of said tray and positioned directly beneath said slots, and a pan for holding cheese and other food products positioned between said sheets.

RICHARD GASCHKE.